United States Patent [19]

Aumüller et al.

[11] Patent Number: 5,726,285
[45] Date of Patent: Mar. 10, 1998

[54] CONDENSATION AND ADDITION POLYMERS HAVING N,N'-BRIDGED BISTETRAMETHYLPIPERIDYLOXY GROUPS

[75] Inventors: Alexander Aumüller, Neustadt; Hubert Trauth, Dudenhofen, both of Germany

[73] Assignee: BASF Aktiengesellschaft, Ludwigshafen, Germany

[21] Appl. No.: 682,631

[22] PCT Filed: Jan. 20, 1995

[86] PCT No.: PCT/EP95/00204

§ 371 Date: Aug. 2, 1996

§ 102(e) Date: Aug. 2, 1996

[87] PCT Pub. No.: WO95/21211

PCT Pub. Date: Aug. 10, 1995

[30] Foreign Application Priority Data

Feb. 2, 1994 [DE] Germany ............... 44 03 084.3

[51] Int. Cl.[6] ................................................. C08G 73/00
[52] U.S. Cl. ............... 528/422; 528/59; 528/62; 528/65; 528/66; 528/73; 525/113; 525/424; 525/425; 525/426; 525/428

[58] Field of Search ............... 528/422, 59, 62, 528/65, 66, 73; 525/113, 424, 425, 426, 428

[56] References Cited

U.S. PATENT DOCUMENTS 4,429,077   1/1984   Karrer et al. ............... 525/143

Primary Examiner—Duc Truong
Attorney, Agent, or Firm—Oblon, Spivak, McClelland, Maier & Neustadt, P.C.

[57] ABSTRACT

Condensation and addition polymers which comprise as structural repeating unit N,N'-bridged bistetramethylpiperidyloxy groups of the formula I

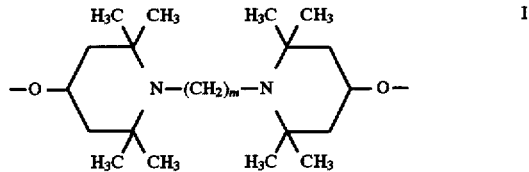

in which m is 2 or 3 are suitable as light stabilizers and other stabilizers for organic material

20 Claims, No Drawings

CONDENSATION AND ADDITION POLYMERS HAVING N,N'-BRIDGED BISTETRAMETHYLPIPERIDYLOXY GROUPS

The present invention relates to novel condensation and addition polymers having N,N'-bridged bistetramethylpiperidyloxy groups, to processes for their preparation and to their use as light stabilizers and as other stabilizers for organic material.

DE-A 27 19 131 describes polyesters formed from 1-(2-hydroxyethyl)-2,2,6,6-tetramethyl-4-hydroxypiperidine and esters of dicarboxylic acids, for example dimethyl succinate, as light stabilizers for plastics and coating materials. Oligomeric polyesters of this kind have become established on the market as conventional light stabilizers.

DE-A 27 19 131, moreover, describes polyesters formed from diols of the general formula

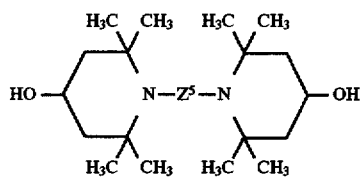

in which $Z^5$ is a $C_4$–$C_8$-alkylene bridge and from esters of dicarboxylic acids, as light stabilizers.

Unsatisfactory features of many of the prior art products are their inadequate compatibility with plastics, the insufficient duration of the protective effect, the inherent color of the substances, the tendency toward volatility and the thermal decomposition of the stabilizers when they are incorporated at elevated temperature.

It is an object of the present invention to provide light stabilizers and/or other stabilizers which provide more effective protection for organic material. A particular objective is to extend the duration of the protective effect, since it is this effect which is generally too short in the case of the polyesters of DE-A 27 19 131.

We have found that this object is achieved by condensation and addition polymers which contain as structural repeating unit N,N'-bridged bistetramethylpiperidyloxy groups of the formula I

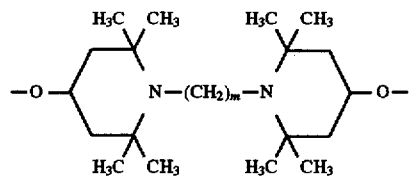

in which m is 2 or 3.

Particularly suitable polyesters are those of the general formula II

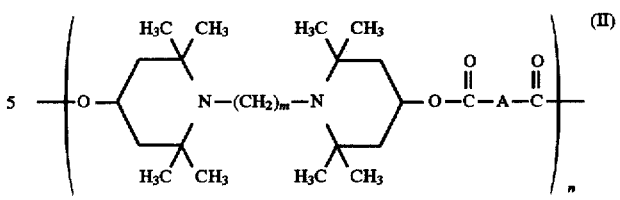

in which

A is a direct bond, $C_1$–$C_{18}$-alkylene which may be interrupted by up to 8 nonadjacent oxygen atoms or bridge members of the formula —NR$^1$—, $C_2$–$C_{18}$-alkenylene, $C_3$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, phenylene, biphenylene or naphthylene which may be substituted by up to 3 $C_1$–$C_8$-alkyl groups or hydroxyl groups, $C_7$–$C_{22}$-phenylalkylene or $C_7$–$C_{22}$-diphenylalkylene which may be substituted by up to 3 $C_1$–$C_8$-alkyl groups or hydroxyl groups, or is a divalent five-or six-membered unsaturated or saturated heterocyclic radical containing up to 3 heteroatoms from the group consisting of nitrogen, oxygen and sulfur and which may additionally be benzo-fused and substituted by up to 3 $C_1$–$C_8$-alkyl groups or hydroxyl groups, and for which in each case one oxygen atom may also be inserted between the bridge member A and one or both flanking carbonyl groups, and $R^1$ is $C_1$–$C_4$-alkyl, m is as defined above, and n is from 2 to 50.

Outstanding results are also achieved with polyurethanes of the general formula III

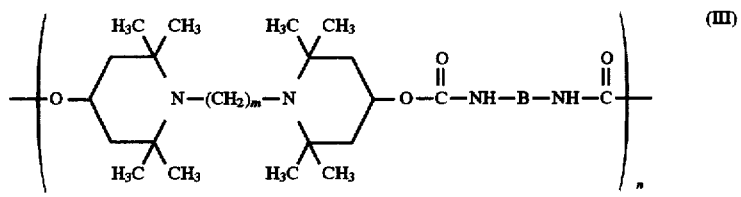

in which

B is $C_2$–$C_{18}$-alkylene which may be interrupted by up to 8 non-adjacent oxygen atoms, $C_4$–$C_{18}$-alkenylene, $C_5$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, or $C_7$–$C_{22}$-phenylalkylene or $C_7$–$C_{22}$-diphenylalkylene which may be substituted by up to 3 $C_1$–$C_8$-alkyl groups, m is as defined above, and n is from 2 to 50.

Outstanding results are also achieved with polyethers of the general formula IV

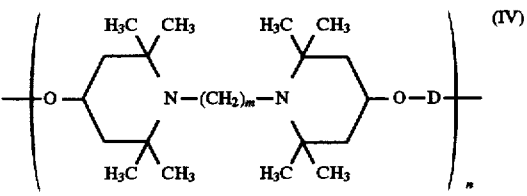

in which

D is $C_2$–$C_{18}$-alkylene which may be interrupted by up to 8 non-adjacent oxygen atoms, $C_4$–$C_{18}$-alkenylene, $C_5$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, or $C_8$–$C_{22}$-phenylalkylene which may be substituted by up to 3 $C_1$–$C_8$-alkyl groups, m is as defined above, and n is from 2 to 50.

Outstanding results are also achieved with polycarbonates of the general formula V

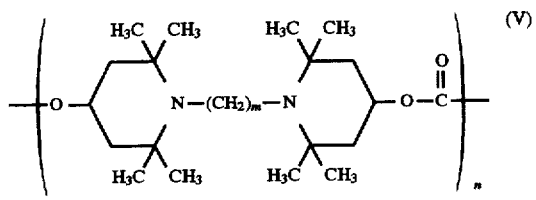

in which m is as defined above, and n is from 2 to 50.

In the condensation and addition polymers according to the invention up to 90 mol %, preferably from 1 to 75 mol % and in particular from 5 to 50 mol % of the group I may be replaced by structural units of the general formula VI

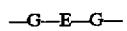           (VI)

in which

E is $C_2$–$C_{30}$-alkylene which may be interrupted by up to 14 non-adjacent oxygen atoms or bridge members of the formula —$NR^2$—, $C_4$–$C_{18}$-alkenylene, $C_3$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, phenylene, biphenylene or naphthylene which may be substituted by up to 3 $C_1$–$C_8$-alkyl groups or hydroxyl groups, or $C_7$–$C_{22}$-phenylalkylene or $C_7$–$C_{22}$-diphenylalkylene which may be substituted by up to 3 $C_1$–$C_8$-alkyl groups or hydroxyl groups, and $R^2$ is hydrogen or $C_1$–$C_4$-alkyl, and G is oxygen or a group —$NR^2$—.

Where A, B, D or E are alkylene groups or alkenylene groups they may be either branched or unbranched.

If in each case one oxygen atom is additionally inserted between the bridge member A and one or both flanking carbonyl groups, the resulting polycarbonate esters or polybiscarbonates are counted as polyesters on the basis of the system of definining the variables.

A may for example be a direct bond. Examples of unbranched $C_1$–$C_{18}$-alkylene groups A are —$(CH_2)_k$— where k is from 1 to 18. k is preferably from 1 to 10, and —$(CH_2)_2$—, —$(CH_2)_3$—, —$(CH_2)_4$—, —$(CH_2)_6$— and —$(CH_2)_8$— are particularly preferred.

Examples of branched $C_1$–$C_{18}$-alkylene groups A are:

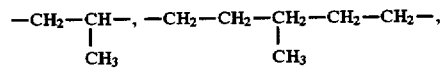

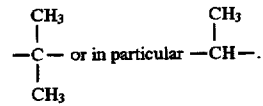

Examples of $C_2$–$C_{18}$-alkenylene(oxy) groups A are:

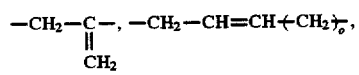

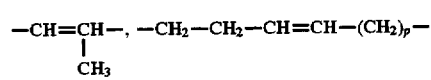

or

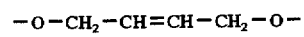

where o is from 0 to 15 and p is from 1 to 14.

Alkenylene groups where o is 1 are preferred, with particular preference being given to

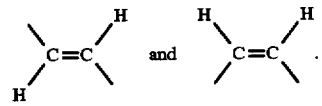

Possible examples of $C_1$–$C_{18}$-alkylene(oxy) interrupted by up to 8, in particular up to 5 and especially up to 3 nonadjacent oxygen atoms or —$NR^1$— are:

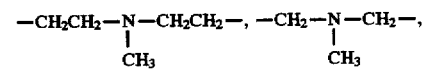

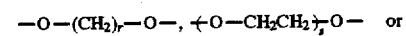

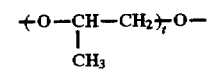

where q is from 1 to 3, r is from 2 to 18, s is from 1 to 9 and t is from 1 to 6.

r is preferably from 2 to 6 and is in particular 4 or 6.

s is preferably from 1 to 3 and is in particular 1 or 3.

t is preferably from 1 to 3 and is in particular 1.

Examples of substituted or unsubstituted $C_3$–$C_{12}$-cycloalkylene(oxy) groups A are:

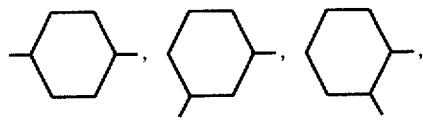

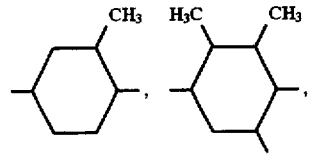

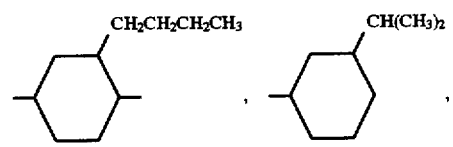

-continued

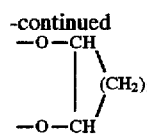

where l is from 1 to 10 and is in particular 3 or 9. A particularly preferred cycloalkylene group is

Examples of substituted or unsubstituted $C_6$–$C_{18}$-cycloalkylalkylene(oxy) groups A are:

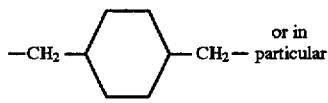

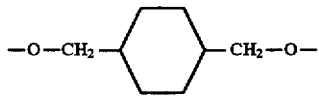

Examples of substituted or unsubstituted phenylene, biphenylene or naphthylene groups A are:

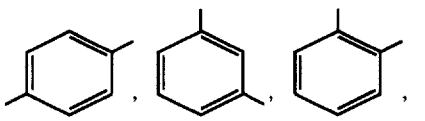

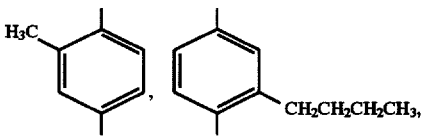

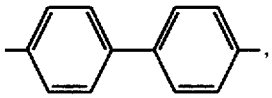

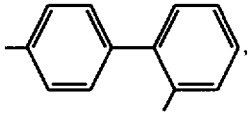

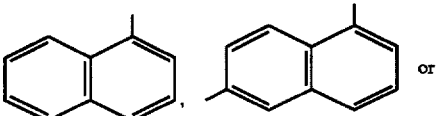

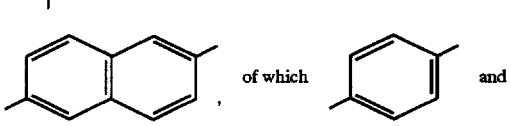 of which 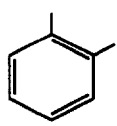 and are preferred.

Divalent, saturated or unsaturated heterocyclic radicals A are derived in particular from thiophene, furan or pyridine, or else, for example, from pyrrolidine, imidazole, thiazole or pyrazine.

Examples of these are:

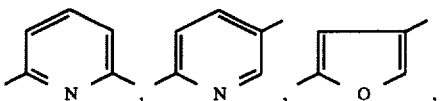

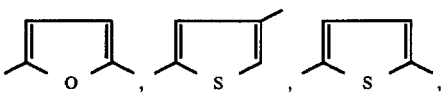

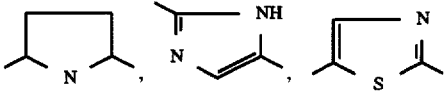

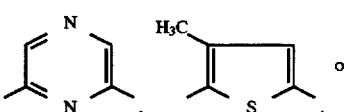

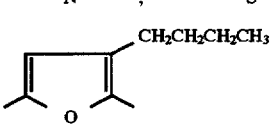

Particularly preferred members from this group are:

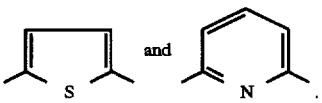

Examples of substituted or unsubstituted $C_7$–$C_{22}$-phenylalkylene groups and $C_7$–$C_{22}$-diphenylalkylene groups A are:

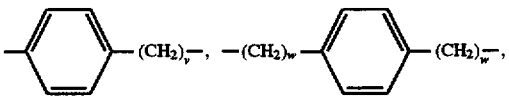

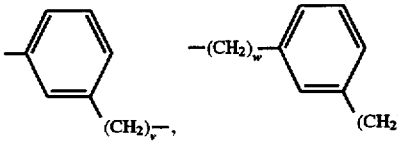

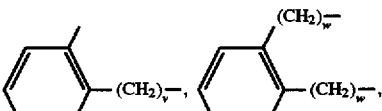

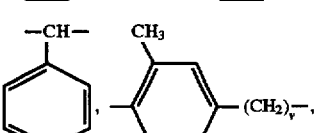

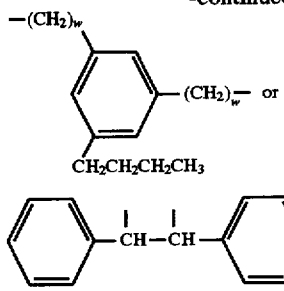

where v is from 1 to 9 and w is from 1 to 6.

v and w are in each case preferably 2 and in particular 1.

As substituents on rings or as radicals $R^1$ or $R^2$, possible examples of $C_1$–$C_4$-alkyl or $C_1$–$C_8$-alkyl are n-propyl, isopropyl, n-butyl, isobutyl, sec-butyl, tert-butyl, n-amyl, isoamyl, sec-amyl, tert-amyl, neopentyl, n-hexyl, n-heptyl, n-octyl and, in partiuclar, ethyl and methyl. Where these alkyl radicals occur as substituents on rings, the number of such substituents per ring system is up to 3, preferably up to 2 and in particular one.

Possible examples of $C_2$–$C_{18}$-alkylene groups B and D are:

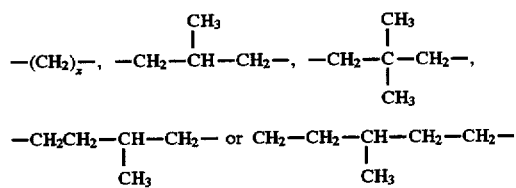

where x is from 2 to 18.

In this context preference is given to groups —($CH_2$)$_x$— where x is from 2 to 8, and in particular is 6.

Possible examples of $C_2$–$C_{18}$-alkylene radicals B and D interrupted by up to 8, in particular up to 5 and especially up to 3 non-adjacent oxygen atoms are:

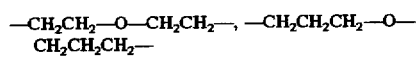

or

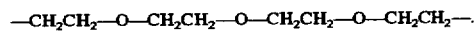

Examples of possible $C_4$–$C_{18}$-alkenylene radicals B and D are:

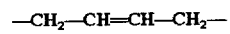

or

Possible examples of substituted or unsubstituted $C_5$–$C_{12}$-cycloalkylene radicals B and D are:

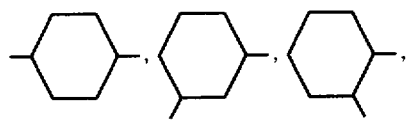

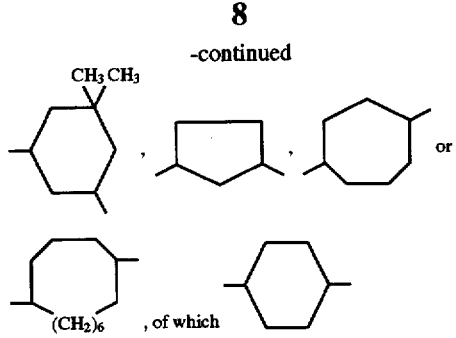

is preferred.

Examples of substituted or unsubstituted $C_6$–$C_{18}$-cycloalkylalkylene radicals B and D are:

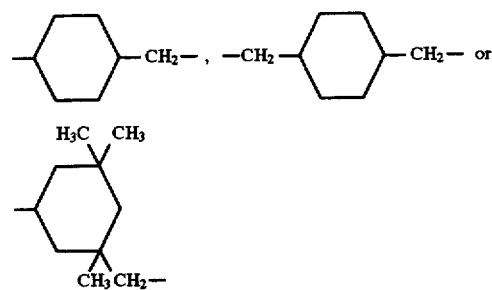

Examples of substituted or unsubstituted phenylene, bisphenylene or naphthylene groups B are:

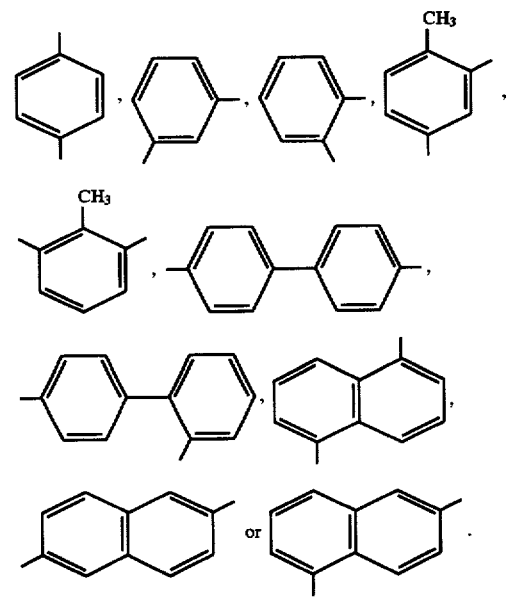

Examples of substituted or unsubstituted $C_7$–$C_{22}$-phenylalkylene groups and $C_7$–$C_{22}$-diphenylalkylene groups B are:

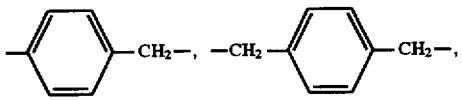

-continued

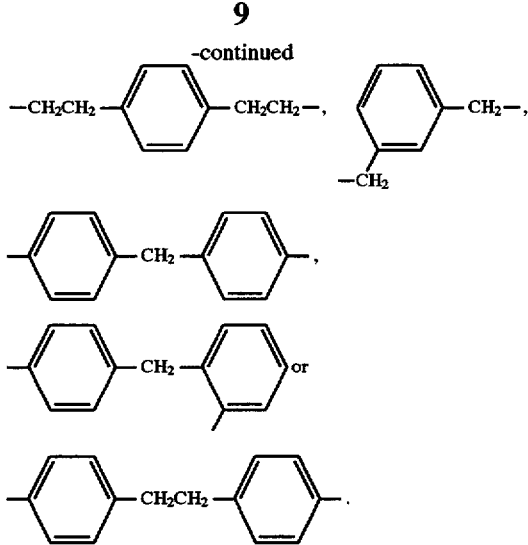

Examples of substituted or unsubstituted $C_8$–$C_{22}$-phenylalkylene groups D are:

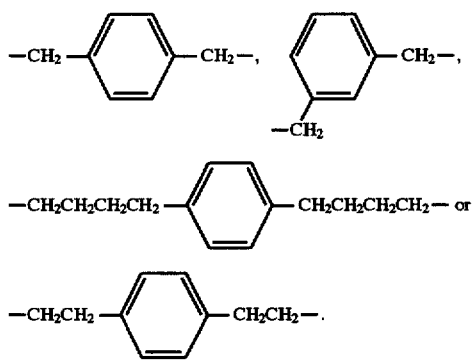

Examples of $C_2$–$C_{30}$-alkylene groups E which may be interrupted by up to 14, in particular up to 8 and especially up to 5 non-adjacent oxygen atoms or —$NR^2$— bridge members are:

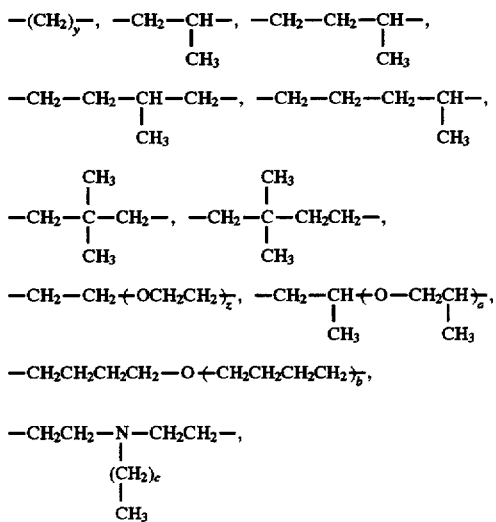

-continued

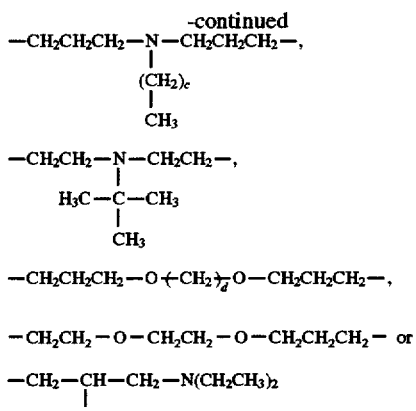

where
y is from 2 to 30,
z is from 1 to 14,
a is from 1 to 9,
b is from 1 to 6,
c is from 0 to 7, and
d is from 2 to 24.

Among these, preferred examples of E are:

—$(CH_2)_y$— and

—$CH_2CH_2$—$(OCH_2CH_2)_z$— in particular

—$(CH_2)_2$—, —$(CH_2)_4$— and

—$(CH_2)_6$—.

Examples of substituted or unsubstituted $C_3$–$C_{12}$-cycloalkylene groups E are:

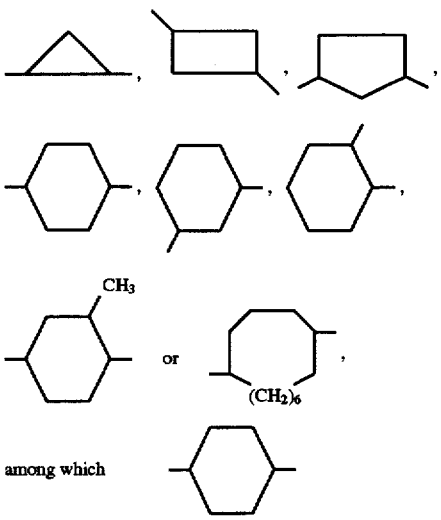

among which

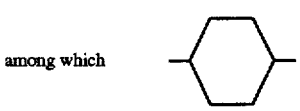

is particularly preferred.

Examples of substituted or unsubstituted phenylene, biphenylene or naphthylene groups E are:

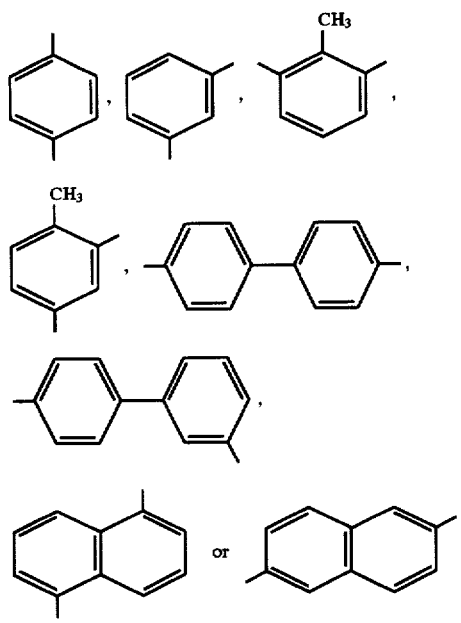

Examples of substituted or unsubstituted $C_7$–$C_{22}$-phenylalkylene or $C_7$–$C_{22}$-diphenylalkylene groups E are:

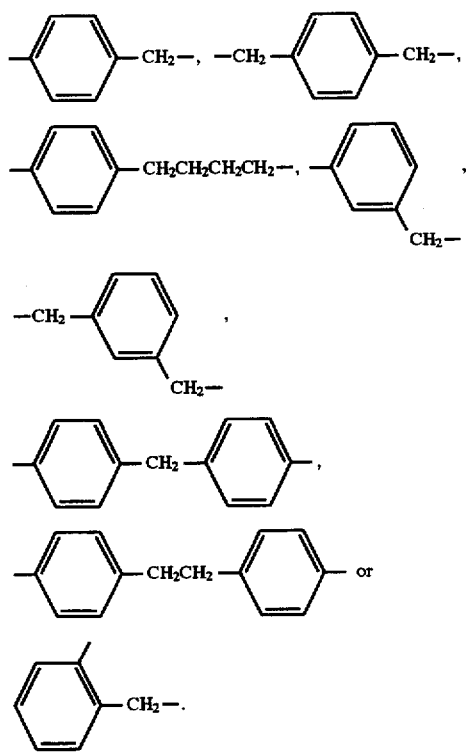

Examples of substituted or unsubstituted $C_6$–$C_{18}$-cycloalkylalkylene groups E are:

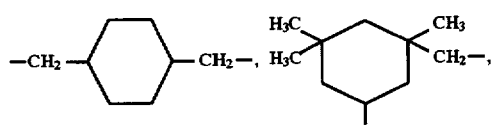

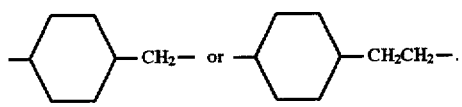

G may for example be oxygen, —NH—,

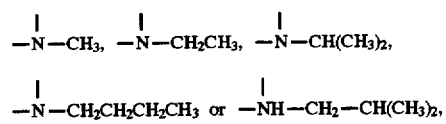

among which oxygen or —NH— is preferred for G.

The degree of polymerization or condensation, n, in the polymers of the invention is from 2 to 50, preferably from 3 to 30 and in particular from 4 to 20, corresponding in terms of order of magnitude to an average molecular weight of from 800 to 25,000, preferably from 1000 to 15,000 and in particular from 1500 to 10,000.

The free bonds at the chain ends in the general formulae II to V are satisfied as usual, in most cases by hydrogen.

The condensation polymers and addition polymers according to the invention can in principle be prepared by two different processes which are likewise a subject of the present invention.

Thus an N,N'-bridged bistetramethylpiperidinol of the formula VII

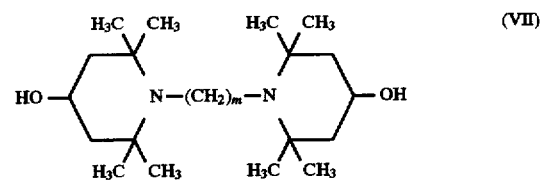

in which m is as defined above can be reacted with appropriate bifunctional OH-reactive compounds.

In this context, for the preparation of polyesters II, an N,N'-bridged bistetramethylpiperidinol VII is reacted with dicarboxylic acid derivatives of the general formula VIII

in which

R$^3$ is hydroxyl, $C_1$–$C_4$-alkoxy or halogen, and

A is as defined above, and the dicarboxylic acid derivative VIII which is employed may also be the intramolecular or intermolecular anhydride of the parent dicarboxylic acid or a mixture of any of the dicarboxylic acid derivatives VIII mentioned.

In this context, for the preparation of the polyurethanes III, an N,N'-bridged bistetramethylpiperidinol VII is reacted with one or more diisocyanates of the general formula IX

in which B is as defined above.

In this context, for the preparation of the polyethers IV, an N,N'-bridged bistetramethylpiperidinol VII is reacted with a dialkylating agent of the general formula X

in which

R$^4$ is halogen or a sulfonyloxy grouping of the formula —O—SO$_2$—R$^5$ in which R$^5$ is $C_1$–$C_4$-alkyl, phenyl or tolyl, and D is as defined above, it also being possible to employ a mixture of the dialkylating agents X mentioned.

In this context, for the preparation of the polycarbonates V, an N,N'-bridged bistetramethylpiperidinol VII is reacted with carbonic acid derivatives of the general formula XI

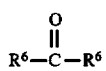

(XI)

in which each of the two radicals $R^6$ is identical or different to the other and is halogen, $C_1$–$C_4$-alkoxy or phenoxy, it also being possible to employ a mixture of the carbonic acid derivatives XI mentioned.

$C_1$–$C_4$-alkyl as $R^5$ and in $R^3$ and $R^6$ is suitably n-propyl, isopropyl, n-butyl, isobutyl, sec-butyl and tert-butyl, but preferably ethyl and, in partiuclar, methyl.

Besides iodine, halogen is in particular bromine and, especially, chlorine.

The diol VII is reacted with the bifunctional OH-reactive compounds generally in an equimolar or approximately equimolar ratio.

The reaction described can be carried out usually at from 20° to 250° C., in particular at from 100° to 200° C., and normally at atmospheric pressure, with or without solvent. Organic solvents which may be used in this context are, for example, aromatic solvents such as toluene, xylene, ethylbenzene, mesitylene, mixtures of relatively highly alkylated aromatic compounds, chlorobenzene or dichlorobenzene, amides such as dimethylformamide, formamide or dimethylacetamide, amines such as triethylamine, tripropylamine or tributylamine, ethers such as dipropyl ether, dibutyl ether or diphenyl ether, and esters such as ethyl benzoate, methyl benzoate, ethyl acetate or butyl acetate.

When preparing the polymers, especially the urethanes III, as described, it may be expedient to use a catalyst in the quantities which are conventional for this purpose. Examples of such catalysts are tertiary amines such as triethylamine, tripropylamine, tributylamine or pyridine. If the reaction produces hydrogen halide, as is the case, for example, in the reaction of VII with dicarboxylic acid halides VIII or dihalides X, then it is advantageous to use an auxiliary base to bind the hydrogen halide. Examples of such auxiliary bases are tertiary amines such as triethylamine, tripropylamine, tributylamine or pyridine, the hydroxides of sodium, potassium, lithium or calcium, the oxides of calcium or magnesium or, preferably, the carbonates and hydrogen carbonates of sodium or potassium. Auxiliary bases of this type are usually added in quantities of from 0.5 to 2.5 equivalents.

In transesterification reactions, as in the reaction of VII with dicarboxylic acid esters VIII, it is advantageous to employ a transesterification catalyst in the quantities which are convention for this purpose. Examples of such catalysts are alcoholates such as sodium methylate, sodium ethylate, or potassium tert-butanolate, titanium compounds such as tetramethyl titanate, tetraethyl titanate, tetraisopropyl titanate or tetra-n-butyl titanate, tin compounds such as dibutyltin diacetate, dibutyltin oxide or dibutyltin dilaurate, magnesium oxide or calcium oxide.

In the second process for the preparation of the condensation and addition polymers of the invention, bistetramethylpiperidyloxy compounds of the general formula XII

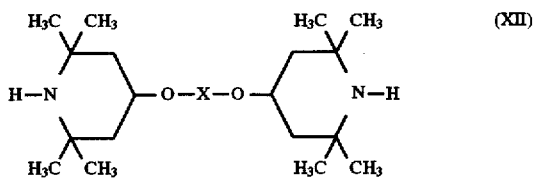

in which X denotes other structural elements of the polymers to be prepared, are reacted with a cyclic carbonate of the general formula XIII

in which m is 2 or 3.

In this context, for the preparation of polyesters II, bistetramethylpiperidyl esters of the general formula XIV

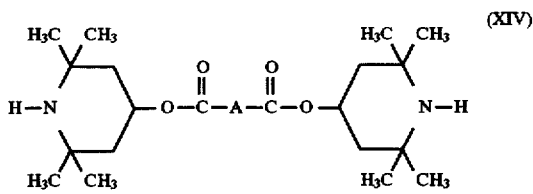

in which A is as defined above are reacted with the cyclic carbonate XIII.

In this context, for the preparation of polyurethanes III, bistetramethylpiperidylurethanes of the general formula XV

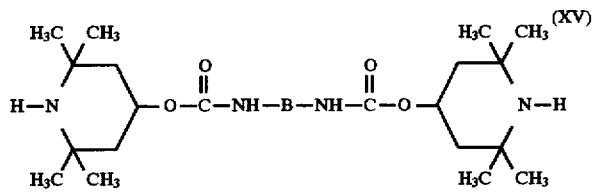

in which B is as defined above are reacted with the cyclic carbonate XIII.

In this context, for the preparation of polyethers IV, bistetramethylpiperidyl ethers of the general formula XVI

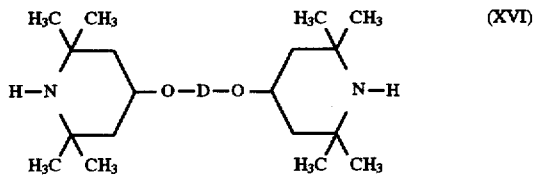

in which D is as defined above are reacted with the cyclic carbonate XIII.

In this context, for the preparation of polycarbonates V, the bistetramethylpiperidyl carbonate of the formula XVII

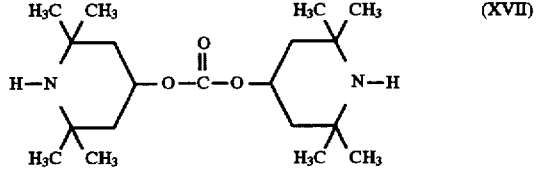

is reacted with the cyclic carbonate XIII.

A particularly suitable cyclic carbonate XIII is ethylene carbonate (m=2).

The reaction is generally carried out at from 60° to 200° C., preferably at from 100° to 180° C. and in particular at from 140° to 165° C. Within the temperature range indicated the reaction is usually complete after from 5 to 25 hours. Since gaseous carbon dioxide is liberated during the reaction, it is advantageous to work at atmospheric pressure or at reduced pressure.

The reaction can be carried out with or without solvent. Particularly suitable organic solvents are those having a boiling point of more than 60° C., preferably more than 100° C. and in particular more than 140° C. Examples of such solvents are:

- alcohols such as methanol, ethanol, isopropanol, ethylene glycol, n-propanol, n-butanol, isobutanol, tert-butanol and, in particular, 2-ethylhexanol, n-octanol or diethylene glycol;
- amides such as formamide, dimethylformamide, dimethylacetamide and, in particular, N-methylpyrrolidinone;
- aromatic compounds such as chlorobenzene, toluene, xylene, ethylbenzene or more highly alkylated benzenes;
- ethers such as diisopropyl ether, di-n-propyl ether, diphenyl ether or tetrahydrofuran;
- tertiary amines such as triethylamine, tributylamine or pyridine;
- polyethylene glycols or polypropylene glycols having a molecular weight of up to about 1000.

It is also possible to employ mixtures of the organic solvents mentioned.

In a preferred embodiment the solvent used is an excess of the cyclic carbonate XIII employed as co-reactant. In this context the molar ratio of bistetramethylpiperidyloxy compounds XII to cyclic carbonate XIII is from 1:1.1 to 1:20, preferably from 1:1.5 to 1:10 and in particular from 1:2 to 1:6, 1 mol of cyclic carbonate XIII being required per mole of starting compound II for the actual reaction.

A further preferred embodiment of the process described comprises the use of a catalyst, which is employed in a quantity of from 0.01 to 25 mol %, preferably from 0.5 to 10 mol % and in particular from 1 to 7 mol % based on the quantity of XII. An increase in the quantity of catalyst beyond 25 mol % is not detrimental to the reaction but does not bring any additional advantages. The catalysts involved come from the following classes:

(i) acidic catalysts, for example
- sulfonic acids such as methanesulfonic acid, trifluoromethanesulfonic acid, benzenesulfonic acid or p-toluenesulfonic acid;
- mineral acids (inorganic acids) such as sulfuric acid, hydrochloric acid or phosphoric acid;
- carboxylic acids such as formic, acetic, propionic, butyric, valeric, caproic, caprylic, capric, stearic, oleic, benzoic, methylbenzoic, phenylacetic, citric, adipic, tartaric, nitrilotriacetic or ethylenediaminetetraacetic acid;

(ii) catalysts containing heavy metals, for example
- tin compounds such as dibutyltin oxide, dibutyltin diacetate or dibutyltin dilaurate;
- titanates such as tetramethoxy titanate, tetraisopropoxy titanate or tetrabutoxy titanate;

(iii) organic catalysts containing a quaternized heteroatom, for example
- phosphonium compounds such as the chlorides, bromides or iodides of the cations methyltriphenylphosphonium, ethyltriphenylphosphonium, butyltriphenylphosphonium, methyltributylphosphonium, methyltriphenoxyphosphonium or tetrabutylphosphonium;
- ammonium compounds such as the chlorides, bromides, iodides or hydroxides of the cations tetramethylammonium, tetraethylammonium, tetrabutylammonium, methyltriphenylammonium, methyltriethylammonium, methyltributylammonium, methyltrihexylammonium, benzyltriethylammonium, benzyltributylammonium, benzyltriphenylammonium or benzyltrihexylammonium;

(iv) halides, generally in anhydrous form, for example
- alkali metal halides such as lithium iodide, sodium bromide, sodium iodide, potassium bromide or potassium iodide;
- alkaline earth metal halides such as calcium chloride, magnesium chloride or magnesium bromide;
- zinc halides such as zinc chloride, zinc bromide or zinc iodide.

The condensation and addition polymers of the invention are outstandingly suitable for stabilizing organic material against the action of light, oxygen and heat. They are also effective as metal deactivators. They are added to the organic material to be stabilized in a concentration of from 0.01 to 5% by weight, preferably from 0.02 to 2% by weight, based on the organic material, either before, during or after its preparation.

The term organic material refers for example to cosmetic preparations such as ointments and lotions, to drug formulations such as pills and suppositories, to photographic recording materials, especially photographic emulsions, or to intermediates for plastics and coating materials, but in particular to plastics and coating materials themselves.

The present invention also relates to organic material which is stabilized to the action of light, oxygen and heat, especially to plastics and coating materials which contain the polymers of the invention in the concentrations indicated above.

In order to mix the polymers of the invention, especially with plastics, it is possible to employ any known apparatus and method for mixing stabilizers or other additives into polymers.

The organic material stabilized by the polymers of the invention may also contain other additives, examples being antioxidants, light stabilizers, metal deactivators, antistats, flame retardants, pigments and fillers.

Antioxidants and light stabilizers which may be added in addition to the polymers of the invention are, for example, compounds based on sterically hindered phenols, or costabilizers containing sulfur or phosphorus.

Examples of such phenolic antioxidants are 2,6-di-tert-butyl-4-methylphenol, n-octadecyl β-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 1,3,5-tris(3,5-di-tert-butyl-4-hydroxybenzyl) isocyanurate, 1,3,5-tris[β-(3,5-di-tert-butyl-4-hydroxybenzyl)propionylethyl]isocyanurate, 1,3,5-tris(2,6-dimethyl-3-hydroxy-4-tert-butylbenzyl) isocyanurate and pentaerythritol tetrakis[β-3,5-di-tert-butyl-4-hydroxyphenyl)propionate].

Examples of suitable phosphorus-containing antioxidants are tris(nonylphenyl) phosphite, distearyl pentaerythritol diphosphite, tris(2,4-di-tert-butylphenyl) phosphite, tris(2-tert-butyl-4-methylphenyl) phosphite, bis(2,4-di-tert-butylphenyl) pentaerythritol diphosphite and tetrakis(2,4-di-tert-butylphenyl) 4,4'-biphenylenediphosphite.

Examples of sulfur-containing antioxidants are dilauryl thiodipropionate, dimyristyl thiodipropionate, distearyl thiodipropionate, pentaerythritol tetrakis(β-laurylthiopropionate) and pentaerythritol tetrakis(β-hexylthiopropionate). Thiobisphenols such as 3,3'-di-tert-butyl-4,4'-dihydroxy-2,2'-dimethyldiphenyl sulfide can also be added.

Other antioxidants and light stabilizers which can be used in conjunction with the polymers of the invention are, for example, 2-(2'-hydroxyphenyl)benzotriazoles, 2-hydroxybenzophenones, aryl esters of hydroxybenzoic acids, α-cyanocinnamic acid derivatives, benzimidazolecarboxanilides, nickel compounds or oxalanilides.

A particularly good degree of stabilization is obtained by adding to the polymers of the invention at least one additional light stabilizer from the class of compounds consisting of the sterically hindered amines, in a conventional concentration.

Examples of further sterically hindered amines which are suitable for this purpose are bis(2,2,6,6-tetramethylpiperidyl) sebacate, bis(1,2,2,6,6-pentamethylpiperidyl) sebacate, the condensation product of 1-hydroxyethyl-2,2,6,6-tetramethyl-4-hydroxypiperidine with succinic acid, the condensation product of N,N'-(2,2,6,6-tetramethylpiperidyl)hexamethylenediamine with 4-tert-octylamino-2,6-dichloro-1,3,5-triazine, tris(2,2,6,6-tetramethylpiperidyl) nitrilotriacetate, tetrakis(2,2,6,6-tetramethyl-4-piperidyl) 1,2,3,4-butanetetracarboxylate, 1,1'-(1,2-ethanediyl)bis(3,3,5,5-tetramethylpiperazinone), and the condensation products of 4-amino-2,2,6,6-tetramethylpiperidines with tetramethylolacetylenediureas.

Examples of plastics which can be stabilized by the polymers of the invention are:

Polymers of mono- and diolefins such as, for example, low-density or high-density polyethylene, polypropylene, linear poly-1-butene, polyisoprene, polybutadiene and copolymers of mono- or diolefins, or mixtures of the polymers mentioned; copolymers of mono- or diolefins with other vinyl monomers, such as, for example, ethylene-alkyl acrylate copolymers, ethylenealkyl methacrylate copolymers, ethylene-vinyl acetate copolymers or ethylene-acrylic acid copolymers;

polystyrene and copolymers of styrene or α-methylstyrene with dienes and/or acrylic derivatives, such as, for example, styrenebutadiene, styrene-acrylonitrile (SAN), styrene-ethyl methacrylate, styrene-butadiene-ethyl acrylate, styrene-acrylonitrilemethacrylate, acrylonitrile-butadiene-styrene (ABS) or methyl methacrylate-butadiene-styrene (MBS);

halogen-containing polymers such as, for example, polyvinyl chloride, polyvinyl fluoride, polyvinylidene fluoride and copolymers thereof;

polymers derived from α,β-unsaturated acids and derivatives thereof, such as polyacrylates, polymethacrylates, polyacrylamides and polyacrylonitriles;

polymers derived from unsaturated alcohols and amines and/or from their acrylic derivatives or acetals, for example polyvinyl alcohol and polyvinyl acetate; and polyurethanes, polyamides, polyureas, polyphenylene ethers, polyesters, polycarbonates, polysulfones, polyether sulfones and polyether ketones.

The polymers of the invention can also be used to stabilize surface coatings, for example industrial coatings. Among these coatings particular emphasis is placed on stoving finishes, which in turn include automotive finishes, and preferably two-coat finishes.

The polymers of the invention can be added to the coating material in solid or dissolved form. In this context their ready solubility in coating systems is a particular advantage.

The polymers of the invention are preferably used for stabilizing polyethylene and, in particular, for stabilizing films and sheets. A further preferred application is in the stabilization of polypropylene and polyamide, and in particular fibers produced from these compounds.

The polymers of the invention show good compatibility with the usual types of plastic and are readily soluble and outstandingly compatible in the conventional coating systems. As a general rule they have little or no inherent color, are stable and nonvolatile at the temperatures customarily employed for processing plastics and coatings, and above all they effect a longer period of protection of materials treated with them.

The examples below illustrate the invention in more detail. The preparation conditions have not been optimized.

Preparation Examples

The solvent employed, Solvesso® 100, is a commercial mixture of aromatic hydrocarbons having a boiling range of 163°–170° C.

The degree of polymerization or condensation, n, is from about 2 to about 25 in each of the following examples.

EXAMPLE 1

628 g (4.0 mol) of 2,2,6,6-tetramethylpiperidine-4-ol, 880 g (10.0 mol) of ethylene carbonate and 30 g (0.08 mol) of tetrabutylammonium iodide were heated at 155° C. for 13 h and at 165° C. for a further 6 h, during which $CO_2$ was given off. The mixture was cooled and 1 l of water was added slowly at up to 130° C. with distillative cooling. The mixture was then allowed to cool with stirring, the precipitate which had formed was filtered off with suction at room temperature and washed with water until the filtrate was colorless. It was then dried to give 603 g of the diol compound of the formula VII (m=2) as a colorless solid, m.p. 264°–267° C.

EXAMPLE 2

51 g of the compound from Example 1, 17.7 g of dimethyl oxalate and 1.5 ml of dibutyltin diacetate in 150 ml of Solvesso 100 were heated at 160° C. for 5.5 h and then at 165° C. for 8 h, during which about 8.5 g of methanol were distilled off. The mixture was cooled to 90° C., diluted with 200 ml of methanol, cooled to room temperature and then filtered with suction, and the isolated solid was washed with methanol and dried, to give 43 g of the compound of the formula

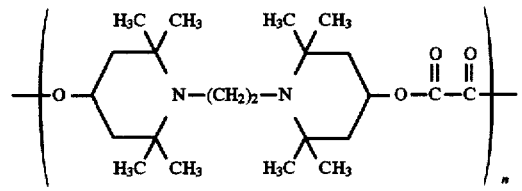

as a colorless solid, m.p. >300° C.

EXAMPLE 3

51 g of the compound from Example 1, 21 g of dimethyl fumarate and 1 g of dibutyltin diacetate in 150 ml of Solvesso 100 were heated at 160° C. for 1 h while removing methanol by distillation. A further 100 ml of Solvesso 100 were then added and the mixture was heated at 165° C. for 12.5 h. It was then cooled to 80° C., diluted with 250 ml of methanol, cooled to room temperature and filtered with suction, and the isolated solid was washed with methanol and dried, to give 60.7 g of the compound of the formula

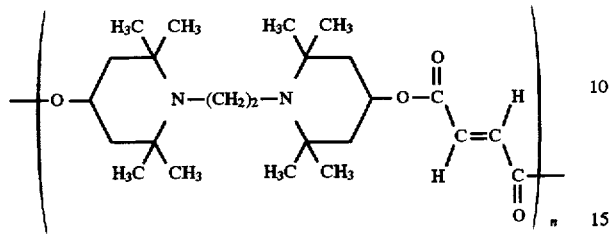

m.p. >310° C.

EXAMPLE 4

51 g of the compound from Example 1, 21 g of dimethyl maleate and 1 g of dibutyltin diacetate in 150 ml of Solvesso 100 were heated at 165° C. for 14.5 h while removing methanol by distillation. The mixture was cooled to 80° C. and then worked up as in Example 3 to give 51.1 g of the compound of the formula

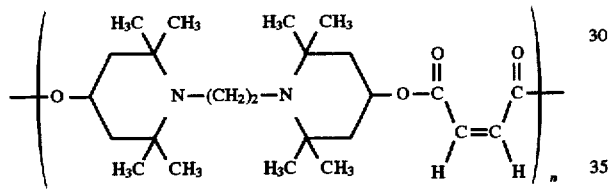

as a colorless solid, m.p. 199°–202° C.

EXAMPLE 5

51 g of the compound from Example 1, 25 g of dimethyl itaconate and 1.5 ml of dibutyltin diacetate were heated as in Example 4 at 165° C. for 14 h. The mixture was diluted with 300 ml of methanol and then worked up as in Example 4 to give 62 g of the compound of the formula

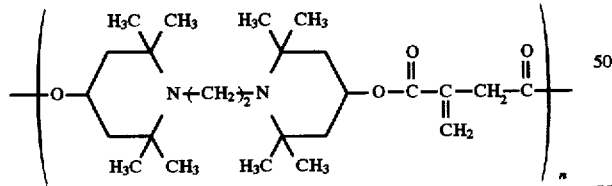

as a colorless solid, m.p. 300° C.

EXAMPLE 6

51 g of the product from Example 1, 19.8 g of dimethyl malonate and 0.5 g of dibutyltin oxide in 150 ml of Solvesso 100 were heated at 155° C. for 4.5 h, at 160° C. for 2.5 h and then at 165° C. for 7 h while removing methanol by distillation. 200 ml of methanol were added and then the mixture was worked up as in Example 5, to give 54.9 g of the compound of the formula

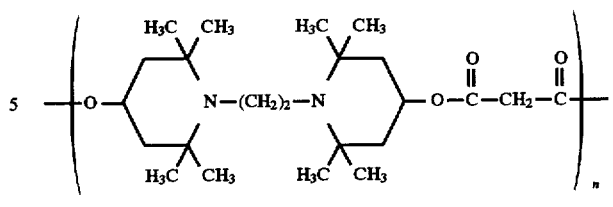

as a colorless solid, m.p. 180°–185° C.

EXAMPLE 7

51 g of the product from Example 1, 36.1 g of diethyl phenylmalonate and 1.5 g of dibutyltin diacetate in 150 ml of Solvesso 100 were heated at 165° C. for 16 h while removing ethanol by distillation. The mixture was worked up as in Example 5 to give 64 g of the compound of the formula

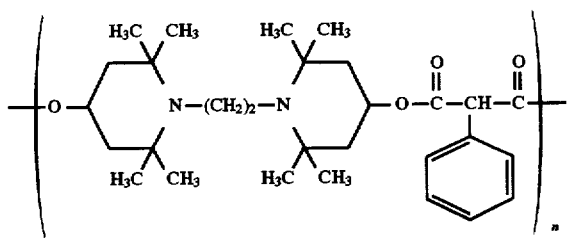

as a colorless solid, m.p. 242°–245° C.

EXAMPLE 8

1g of the product from Example 1, 21.9 g of dimethyl succinate and 0.5 g of dibutyltin oxide in 150 ml of Solvesso 100 were heated at 155° C. for 4.5 h, at 160° C. for 2.5 h and at 165° C. for 5.5 h, while removing methanol by distillation, and were then heated, following the addition of a further 60 ml of Solvesso 100, at 170° C. for 1.5 h. The mixture was then worked up as in Example 2 to give 59.5 g of the compound of the formula

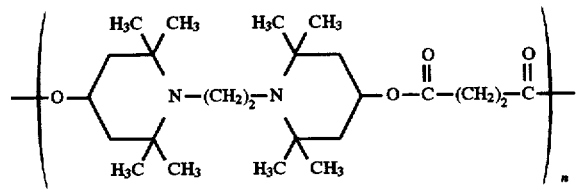

as a colorless solid, m.p. 303°–305° C.

EXAMPLE 9

51 g of the product from Example 1, 24 g of dimethyl glutarate and 1.5 ml of dibutyltin diacetate in 150 ml of Solvesso were reacted at 165° C. for 16 h. The mixture was worked up as in Example 5 to give 60 g of the compound of the formula

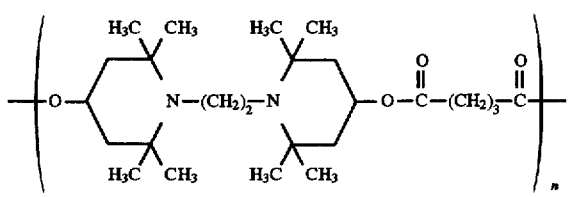

as a colorless solid, m.p. 278°–283° C.

EXAMPLE 10a 51 g of the product from Example 1, 26.1 g of dimethyl adipate and 0.5 g of dibutyltin oxide in 150 ml of Solvesso 100 were heated at 165° C. for 8 h while removing methanol by distillation. The mixture was worked up as in Example 3 to give 57.4 g of the compound of the formula

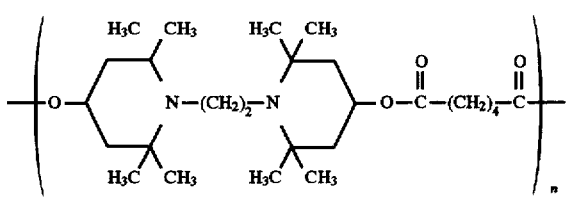

as a colorless solid, m.p. 242°–245° C.

EXAMPLE 10b

The same batch as in Example 10a was heated at 165° C. for 25 h. It was worked up similarly to give 65.8 g of a polyester having the same formula as that in Example 10a but with a slightly higher value of n, as a colorless solid, m.p. 254°–255° C.

EXAMPLE 11

51 g of the product from Example 1, 32.4 g of diethyl pimelate and 1.5 ml of dibutyltin diacetate in 150 ml of Solvesso 100 were heated at 165° C. for 15 h while removing ethanol by distillation. The mixture was worked up as in Example 2 to give 58 g of the compound of the formula

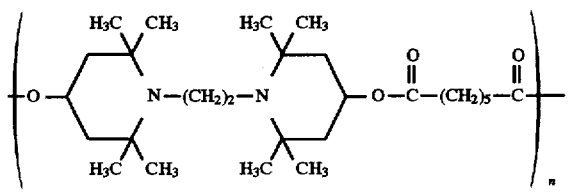

as a colorless solid, m.p. 138°–142° C.

EXAMPLES 12a–f 51 g of the product from Example 1, 34.5 g of dimethyl sebacate and various catalysts in 150 ml of Solvesso 100 were reacted and were worked up in the manner indicated in Example 2. The results are compiled in Table 1. The product obtained in each case was a compound of the formula

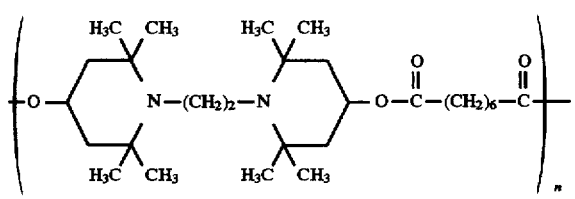

with a slightly differing value for n in each case.

TABLE 1

Effect of different catalysts on the formation of product

| Example No. | Catalyst/quantity | Reaction time | Reaction temperature | Quantity of product | m.p. |
|---|---|---|---|---|---|
| 12a | Dibutyltin diacetate 1 ml | 8 h | 165° C. | 68 g | 180–181° C. |
| 12b | Tetrabutyl o-titanate 1 ml | 8 h | 165° C. | 66.6 g | 169–170° C. |
| 12c | Potassium tert-butylate 1 g | 7 h | 165° C. | 40 g | 159–162° C. |
| 12d | Tetrabutyl orthotitanate 1 ml | 14 h | 165° C. | 70.6 g | 177–178° C. |
| 12e | Dibutyltin diacetate 1 ml | 14 h | 165° C. | 55 g | 174–175° C. |
| 12f | Dibutyltin oxide 0,5 g | 14 h | 163° C. | 61.7 g | 176–178° C. |

EXAMPLE 13

51 g of the product from Example 1, 29.1 g of dimethyl terephthalate and 1.5 ml of dibutyltin diacetate in 150 ml of Solvesso 100 were heated at 160° C. for 5.5 h while removing methanol by distillation. 75 ml of Solvesso 100 were added and heating was continued at 165° C. for 8 h. The mixture was then worked up as in Example 1 to give 68.8 g of the compound of the formula

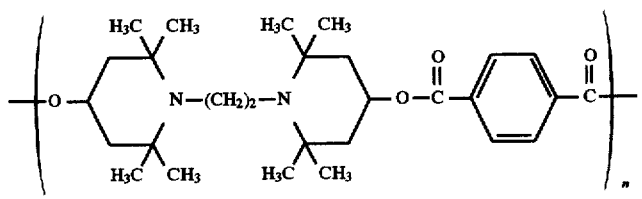

as a colorless solid, m.p. >310° C.

EXAMPLE 14

51 g of the product from Example 1, 29.1 g of dimethyl phthalate and 1.5 ml of dibutyltin diacetate were reacted and worked up as in Example 13, to give 50 g of the polyester compound of the formula

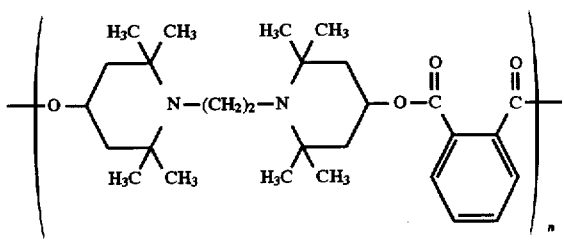

as a colorless solid, m.p. 292°–297° C.

EXAMPLE 15

51 g of the product from Example 1, 17.7 g of dimethyl carbonate and 3.5 ml of dibutyltin oxide in 150 ml of Solvesso 100 were heated at 150° C., the diethyl carbonate which distilled off being recycled continuously to the reaction mixture. Heating was then continued at 165° C. for 11 h and the mixture was worked up in the manner indicated in Example 2, to give 47.8 g of the polycarbonate of the formula

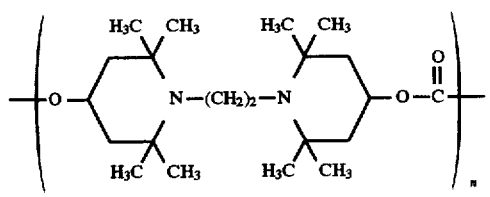

as a colorless solid, m.p. >300° C.

EXAMPLE 16

51 g of the product from Example 1, 25.2 g of hexamethylene 1,6-diisocyanate and 5 g of tributylamine in 150 ml of Solvesso 100 were heated at 70° C. for 3 h, at 90° C. for 2 h, at 110° C. for 1 h, at 130° C. for 5.5 h, at 155° C. for 2 h and at 165° C. for 7 h. After addition of methanol to the mixture it was heated under reflux for 2 h and worked up in a conventional manner to give 56.5 g of the polyurethane of the formula

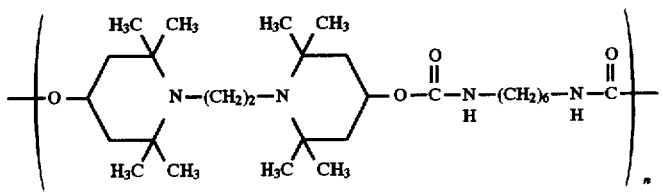

as a colorless solid, m.p. 208°–212° C.

EXAMPLE 17

51 g of the product from Example 1, 37.5 g of 4,4'-diphenylmethane diisocyanate and 5 g of tributylamine in 250 ml of Solvesso 100 were heated at 145° C. for 7 h and at 165° C. for an additional 7 h. Methanol was added to the mixture, which was then filtered and worked up in a conventional manner, to give 82 g of the polyurethane of the formula

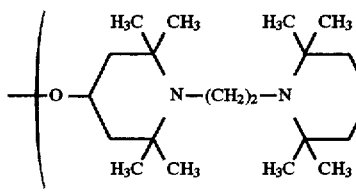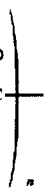

as a colorless solid, m.p. 291°–295° C.

EXAMPLE 18

An experiment like that of Example 17 but using a 1:1 mixture of 4,4'-diphenylmethane diisocyanate and 2,4'-diphenylmethane diisocyanate gave 82.6 g of the analogous polyurethane, m.p. 238°–243° C.

EXAMPLE 19

51 g of the product from Example 1, 26.1 g of an 8:2 mixture of 2,4-tolylene diisocyanate and 2,6-tolylene diisocyanate and 5 g of tributylamine in 150 ml of Solvesso 100 were reacted in the manner indicated in Example 17, to give 72 g of the corresponding polyurethane as a colorless solid, m.p. 248°–253° C.

EXAMPLE 20

38.25 g of the product from Example 1, 4.42 g of 1,6-hexanediol, 21.9 g of dimethyl succinate and 1 ml of dibutyltin diacetate in 150 ml of Solvesso 100 were heated at 165° C. for 14 h. The mixture was worked up as in Example 2 to give 44.5 g of the mixed polyester as a colorless solid, m.p. 293°–297° C.

EXAMPLE 21

38.25 g of the product from Example 1, 4.42 g of 1,6-hexanediol, 26.10 g of dimethyl adipate and 1 ml of dibutyltin diacetate in 150 ml of Solvesso 100 were reacted and worked up as in Example 20, to give 50.4 g of the mixed polyester as a colorless solid, m.p. 192°–198° C.

EXAMPLE 22a 38.25 g of the product from Example 1, 4.35 g of 1,4-cyclohexane diol, 26.1 g of dimethyl adipate and 1.5 ml of dibutyltin diacetate in 150 ml of Solvesso 100 were reacted and worked up as in Example 20, to give 52 g of the mixed polyester as a colorless solid, m.p. 198°–202° C.

EXAMPLE 22b 34.0 g of the product from Example 1, 11.6 g of 1,4-cyclohexanediol, 34.8 g of dimethyl adipate and 1.5 ml of dibutyltin diacetate in 125 ml of Solvesso 100 were reacted and worked up as in Example 20, to give 38.4 g of the mixed polyester as a colorless solid, m.p. 172°–176° C.

EXAMPLE 23

34.5 g of the product from Example 1, 4.83 g of 1,4-cyclohexanedimethanol, 19.65 g of dimethyl succinate and 1.5 ml of dibutyltin diacetate in Solvesso 100 were reacted and worked up as in Example 20, to give 41 g of the mixed polyester as a colorless solid, m.p. 288°–293° C.

EXAMPLE 24

38.25 g of the product from Example 1, 5.4 g of 1,4-cyclohexane-dimethanol, 26.1 g of dimethyl adipate and 1.5 ml of dibutyltin diacetate were reacted and worked up as in Example 20, to give 53 g of the mixed polyester as a colorless solid, m.p. 180°–188° C.

EXAMPLE 25a 38.25 g of the product from Example 1, 4.35 g of 1,6-hexamethylenediamine, 26.1 g of dimethyl adipate and 1.5 ml of dibutyltin diacetate in 150 ml of Solvesso 100 were reacted and worked up as in Example 20, to give 43.5 g of the polyesteramide as a colorless solid, m.p. 223°–226° C.

EXAMPLE 25b 34.0 g of the product from Example 1, 11.6 g of 1,6-hexamethylenediamine, 34.8 g of dimethyl adipate and 1.5 ml of dibutyltin diacetate were reacted and worked up as in Example 20, to give 42.6 g of the polyesteramide as a colorless solid, m.p. 219°–224° C.

EXAMPLE 26

102 g of the product from Example 1, 21.6 g of dimethyl maleate, 24.5 g of dimethyl glutarate and 2 ml of dibutyltin diacetate in 200 ml of Solvesso 100 were stirred at 160°–165° C. for 15 h, removing methanol by distillation. The solvent was distilled off in vacuo and the residue was taken up in 100 ml of methanol. The mixture was filtered and the solid product was dried to give 120.5 g of the corresponding polyester, m.p. 156°–157° C.

EXAMPLE 27

51 g of the product from Example 1, 10.8 g of dimethyl maleate, 13.0 g of dimethyl adipate and 1 ml of dibutyltin diacetate in 150 ml of Solvesso 100 were reacted as in Example 26. The mixture was cooled to room temperature and then 500 ml of methanol and 150 ml of acetone were added. The mixture was filtered and the solid product was dried to give 33.5 g of the corresponding polyester, m.p. 149°–151° C.

EXAMPLE 28

102 g of the product from Example 1, 21.6 g of dimethyl maleate, 22.1 g of dimethyl succinate and 2 ml of dibutyltin diacetate in 200 ml of Solvesso 100 were reacted as in Example 26. The mixture was cooled and stirred into 500 ml of methanol, and the solid was filtered off and dried to give 117 g of the corresponding polyester, m.p. 278°–280° C.

EXAMPLE 29

102 g of the product from Example 1, 26.1 g of dimethyl adipate, 22.1 g of dimethyl succinate and 2 ml of dibutyltin diacetate in 200 ml of Solvesso 100 were reacted and worked up as in Example 28, to give 130 g of the corresponding polyester, m.p. 255°–258° C.

EXAMPLE 30

Example 29 was repeated but using 24.5 g of dimethyl glutarate instead of the dimethyl succinate, to give 117 g of the corresponding polyester, m.p. 190°–192° C.

EXAMPLE 31

51 g of the product from Example 1, 13.0 g of dimethyl adipate, 17.5 g of dimethyl sebacate and 1 ml of dibutyltin diacetate in 50 ml of Solvesso 100 were reacted and worked up as in Example 28, to give 64 g of the corresponding polyester, m.p. 157°–160° C.

EXAMPLE 32

114.7 g of the product from Example 1, 18.1 g of N,N-bis(2-hydroxyethyl)-tert-butylamine, 78.4 g of dimethyl adipate and 3 ml of dibutyltin diacetate were heated at 165° C. for 15 h, removing methanol by distillation. The melt was cooled and recrystallized from 500 ml of methanol, and the crystals were filtered off, to give 140.4 g of the corresponding polyester, m.p. 214°–220° C.

EXAMPLE 33

114.7 g of the product from Example 1, 18.1 g of N,N-bis(2-hydroxyethyl)-tert-butylamine, 64.9 g of dimethyl maleate and 3 ml of dibutyltin diacetate were reacted as in Example 32. The mixture is cooled to room temperature and then the solidified melt was pulverized to give 168 g of the corresponding polyester, m.p. 129°–132° C.

EXAMPLE 34

114.7 g of the product from Example 1, 11.7 g of neopentylglycol, 78.4 g of dimethyl adipate and 3 ml of dibutyltin diacetate were reacted and worked up as in Example 32, to give 167.8 g of the corresponding polyester, m.p. 228°–230° C.

EXAMPLE 35

114.7 g of the product from Example 1, 11.7 g of neopentylglycol, 64.9 g of dimethyl maleate and 3 ml of dibutyltin diacetate in 100 ml of Solvesso 100 were reacted and worked up as in Example 28, to give 100.4 g of the corresponding polyester, m.p. 148°–150° C.

EXAMPLE 36

51 g of the product from Example 1, 28.8 g of tripropylene glycol, 52.2 g of dimethyl adipate and 2 ml of dibutyltin diacetate were reacted and worked up as in Example 28, to give 44.8 g of the corresponding polyester, m.p. 161°–164° C.

EXAMPLE 37

76.5 g of the product from Example 1, 7.6 g of 2-methyl-2-butene-1,4-diol, 43.2 g of dimethyl maleate and 2 ml of dibutyltin diacetate were reacted as in Example 28, the solvent was distilled off and the residue was taken up in 200 ml of acetone and poured into 1 l of ice-water. The mixture was filtered and the solid product was dried to give 107.5 g of the corresponding polyester, m.p. 122°–127° C.

EXAMPLE 38

76.5 g of the product of Example 1, 7.6 g of 2-methyl-2-butene-1,4-diol, 52.3 g of dimethyl adipate and 2 ml of dibutyltin diacetate in 50 ml of Solvesso 100 were reacted and worked up as in Example 28, to give 106.6 g of the corresponding polyester, m.p. 192°–194° C.

EXAMPLE 39

31 g of bis(2,2,6,6-tetramethyl-4-piperidyl) sebacate, 25.1 g of ethylene carbonate and 0.1 g of tetrabutylammonium iodide were heated at 160°≧170° C. for 24 h. The mixture was cooled to 90° C. and then 100 ml of methanol were added dropwise. The mixture was filtered at room temperature and the solid product was dried to give 17.3 g of the polyester of the formula

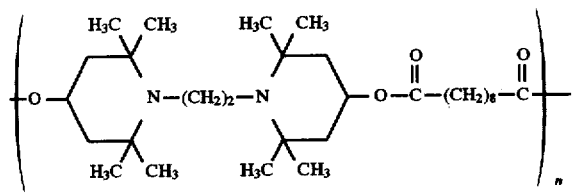

m.p. 139°≧140° C.

Use Examples

Example A

Stabilization of polypropylene injection moldings 0.25% by weight of the stabilizer was dissolved in the polymer, polypropylene (Novolen® 1300 H from BASF AG), by single extrusion at a polymer temperature of 240° C. and the resulting granules were injection molded at 240° C. to give test specimens of 2 mm in thickness.

The test specimens were weathered in a rapid weathering apparatus of the type Xenotest® 1200. The surface quality of the test specimen as a function of the weathering time is taken as a measure of the photooxidative degradation of the polymer, the weathering time measured being the time until cracking appears. The results are summarized in Table 2.

TABLE 2

| Stabilization of polypropylene injection moldings | |
|---|---|
| Stabilizer | Weathering time to cracking/h |
| Example 2 | 1500 |
| Example 3 | 1500 |
| Example 4 | 2000 |
| Example 5 | 1500 |
| Example 6 | 1500 |
| Example 7 | 2500 |
| Example 8 | 1500 |
| Example 9 | 1500 |
| Example 10a | 2500 |
| Example 11 | 3000 |
| Example 12e | >3000 |
| Example 13 | 1500 |
| Example 14 | 1500 |
| Example 15 | 1500 |
| Example 16 | 2500 |
| Example 22a | 3000 |
| Example 22b | 3000 |
| Example 25a | 3000 |
| Comparison* | 1500 |

*Comparison: Example 1 of DE-A 27 19 131 ≙ Tinuvin ® 622 from Ciba Geigy AG of the formula

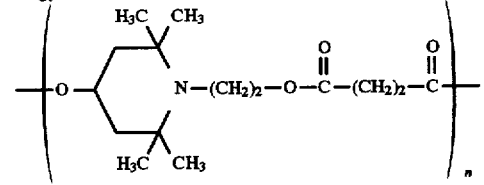

Example B

Stabilization of polypropylene sheets

The granules obtained in Example A were pressed to give sheets having a thickness of 250 μm. These sheets were weathered in the Xenotest 1200 until they became brittle. The results are summarized in Table 3.

TABLE 3

| Stabilization of polypropylene sheets | |
|---|---|
| Stabilizer | Weathering time until embrittlement/h |
| Example 4 | 3000 |
| Example 7 | 3000 |
| Example 9 | 2000 |
| Example 10a | 4000 |
| Example 11 | >3000 |
| Example 12e | 4000 |
| Example 13 | 2500 |
| Example 14 | 2500 |
| Example 15 | 2000 |
| Example 16 | 2000 |
| Example 22a | 2500 |
| Example 22b | 3000 |
| Example 25a | 3000 |
| Comparison*) | 2000 |

*)Comparison: see Table 2

Example C

Stabilization of polyethylene sheets 0.1% by weight of the stabilizer were dissolved in the polymer, polyethylene (Lupolen® 1840 D from BASF AG) by single extrusion at a polymer temperature of 180° C. and the resulting granules were pressed to give test sheets having a thickness of 250 μm, which were weathered in the Xenotest 1200 until they became brittle. The time measured was the time until embrittlement. The results are summarized in Table 4.

TABLE 4

| Stabilization of polypropylene sheets | |
|---|---|
| Stabilizer | Weathering time until embrittlement/h |
| Example 2 | >3000 |
| Example 3 | >3500 |
| Example 4 | >3500 |
| Example 5 | >3000 |
| Example 6 | >3000 |
| Example 7 | 3500 |
| Example 8 | 2500 |
| Example 9 | 2500 |
| Example 10a | 3000 |
| Example 11 | >3000 |
| Example 12e | 3500 |
| Example 13 | >3000 |
| Example 14 | 2500 |
| Example 15 | >3000 |
| Example 16 | 3000 |
| Example 22a | 2500 |
| Example 22b | 3000 |

TABLE 4-continued

| Stabilization of polypropylene sheets | |
|---|---|
| Stabilizer | Weathering time until embrittlement/h |
| Example 25a | >2000 |
| Comparison*) | 2000 |

*)Comparison: see Table 2

We claim:

1. A condensation or addition polymer which contains as structural repeating unit an N,N'-bridged bistetramethylpiperidyloxy group of the formula I

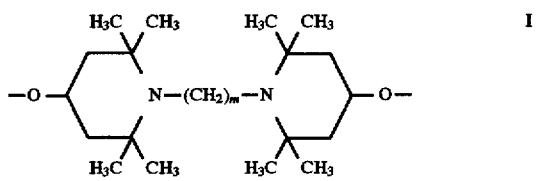

in which m is 2 or 3.

2. A polyester as claimed in claim 1 of the formula II

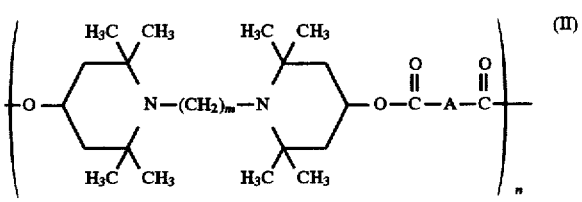

in which

A is a direct bond, $C_1$–$C_{18}$-alkylene which may be interrupted by up to 8 nonadjacent oxygen atoms or bridge members of the formula —$NR^1$—, $C_2$–$C_{18}$-alkenylene, $C_3$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, phenylene, biphenylene or naphthylene which may be substituted by up to 3 $C_1$–$C_8$-alkyl groups or hydroxyl groups, $C_7$–$C_{22}$-phenylalkylene or $C_7$–$C_{22}$-diphenylalkylene which may be substituted by up to 3 $C_1$–$C_8$-alkyl groups or hydroxyl groups, or is a divalent five- or six-membered unsaturated or saturated heterocyclic radical containing up to 3 heteroatoms from the group consisting of nitrogen, oxygen and sulfur and which may additionally be benzo-fused and substituted by up to 3 $C_1$–$C_8$-alkyl groups or hydroxyl groups, and for which in each case one oxygen atom may also be inserted between the bridge member A and one or both flanking carbonyl groups, and $R^1$ is $C_1$–$C_4$-alkyl, m is as defined above, and n is from 2 to 50.

3. A polyurethane as claimed in claim 1 of the formula III

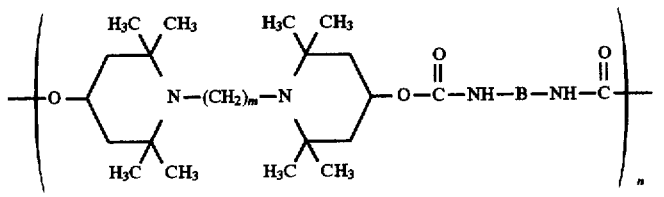

in which
B is $C_2$–$C_{18}$-alkylene which may be interrupted by up to 8 nonadjacent oxygen atoms, $C_4$–$C_{18}$-alkenylene, $C_5$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, or $C_7$–$C_{22}$-phenylalkylene or $C_7$–$C_{22}$-diphenylalkylene which may be substituted by up to 3 $C_1$–$C_8$-alkyl groups, m is as defined above, and n is from 2 to 50.

4. A polyether as claimed in claim 1 of the formula IV

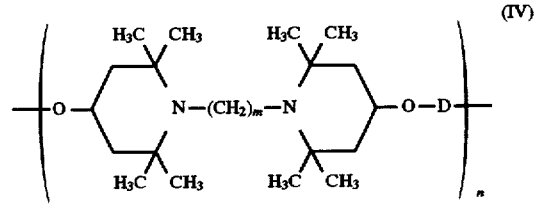

in which
D is $C_2$–$C_{18}$-alkylene which may be interrupted by up to 8 non-adjacent oxygen atoms, $C_4$–$C_{18}$-alkenylene, $C_5$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, or $C_8$–$C_{22}$-phenylalkylene which may be substituted by up to 3 $C_1$–$C_8$-alkyl groups, m is as defined above, and n is from 2 to 50.

5. A polycarbonate as claimed in claim 1 of the formula V

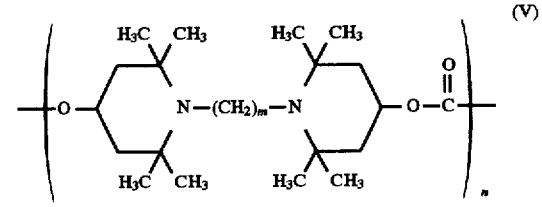

in which m is as defined above, and n is from 2 to 50.

6. A condensation or addition polymer as claimed in claim 1, in which up to 90 mol % of the group I is replaced by structural units of the formula VI

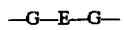   (VI)

in which

E is $C_2$–$C_{30}$-alkylene which may be interrupted by up to 14 nonadjacent oxygen atoms or bridge members of the formula —$NR^2$—, $C_4$–$C_{18}$-alkenylene, $C_3$–$C_{12}$-cycloalkylene which may be substituted by up to 3 $C_1$–$C_4$-alkyl groups, $C_6$–$C_{18}$-cycloalkylalkylene which may be substituted by up to 3 $C_1$–$C_4$-alkyl groups, phenylene, biphenylene or naphthylene which may be substituted by up to 3 $C_1$–$C_8$-alkyl groups or hydroxyl groups, or $C_7$–$C_{22}$-phenylalkylene or $C_7$–$C_{22}$-diphenylalkylene which may be substituted by up to 3 $C_1$–$C_8$-alkyl groups or hydroxyl groups, and $R^2$ is hydrogen or $C_1$–$C_4$-alkyl, and G is oxygen or a group —$NR^2$—.

7. A process for the preparation of a condensation or addition polymer containing structural repeating units I as in claim 1, which comprises reacting an N,N'-bridged bistetramethylpiperidinol of the formula VII

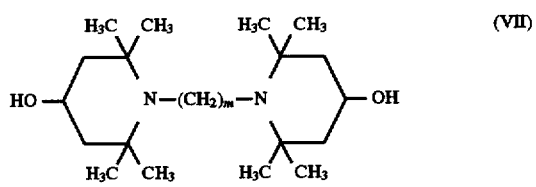

in which m is as defined above with an appropriate bifunctional OH-reactive compound.

8. A process for the preparation of a polyester II as claimed in claim 2, which comprises reacting an N,N'-bridged bistetramethylpiperidinol of the formula VII

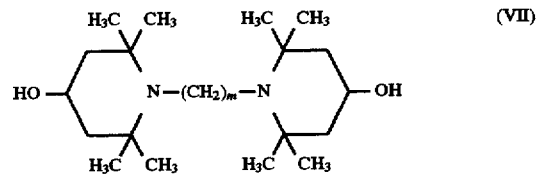

in which m is as defined above with a dicarboxylic acid derivative of the formula VIII

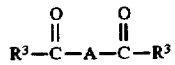   (VIII)

in which $R^3$ is hydroxyl, $C_1$–$C_4$-alkoxy or halogen, and

A is as defined above, and the dicarboxylic acid derivative VIII which is employed may also be the intramolecular or intermolecular anhydride of the parent dicarboxylic acid.

9. A process for the preparation of a polyurethane III as claimed in claim 3, which comprises reacting an N,N'-bridged bistetramethylpiperidinol of the formula VII

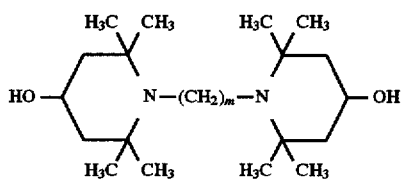 (VII)

in which m is as defined above with a diisocyanate of the formula IX

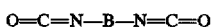  (IX)

in which B is as defined above.

10. A process for the preparation of a polyether IV as claimed in claim 4, which comprises reacting an N,N'-bridged bistetramethylpiperidinol of the formula VII

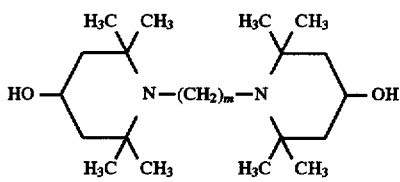 (VII)

in which m is as defined above with a dialkylating agent of the formula X

R⁴—D—R⁴  (X)

in which

R⁴ is halogen or a sulfonyloxy group of the formula —O—SO₂—R⁵ in which R⁵ is $C_1$–$C_4$-alkyl, phenyl or tolyl, and D is as defined above.

11. A process for the preparation of a polycarbonate V as claimed in claim 5, which comprises reacting an N,N'-bridged bistetramethylpiperidinol of the formula VII

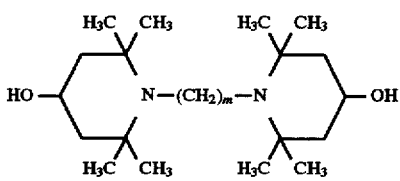 (VII)

in which m is as defined above with a carbonic acid derivative of the formula XI

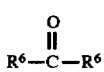 (XI)

in which each of the two radicals R⁶ is identical or different to the other and is halogen, $C_1$–$C_4$-alkoxy or phenoxy.

12. A process for the preparation of a condensation or addition polymer containing structural repeating units I as in claim 1, which comprises reacting a bistetramethylpiperidyloxy compound of the formula XII

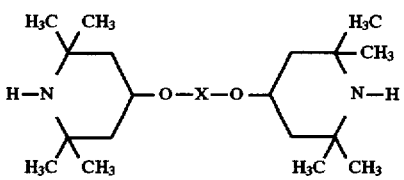 (XII)

in which X denotes other structural elements of the polymer to be prepared with a cyclic carbonate of the formula XIII

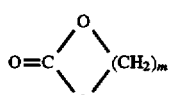 (XIII)

in which m is 2 or 3.

13. A process for the preparation of polyester II as claimed in claim 2, which comprises reacting a bistetramethylpiperidyl ester of the formula XIV

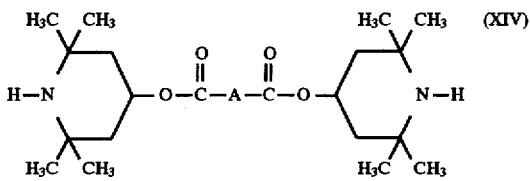 (XIV)

in which A is as defined above with a cyclic carbonate XIII

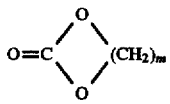 (XIII)

in which m is 2 or 3.

14. A process for the preparation of a polyurethane III as claimed in claim 3, which comprises reacting a bistetramethylpiperidylurethane of the formula XV

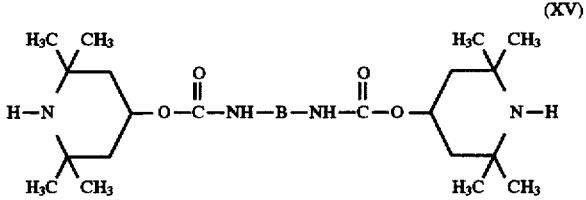 (XV)

in which B is as defined above with a cyclic carbonate of the formula XIII

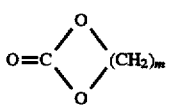 (XIII)

in which m is 2 or 3.

15. A process for the preparation of a polyether IV as claimed in claim 4, which comprises reacting a bistetramethylpiperidyl ether of the formula XVI

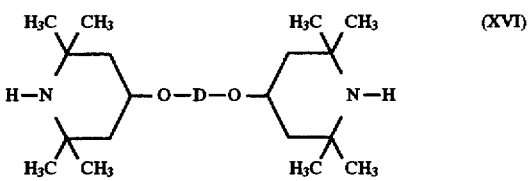 (XVI)

in which D is as defined above with a cyclic carbonate of the formula XIII

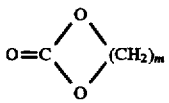 (XIII)

in which m is 2 or 3.

16. A process for the preparation of a polycarbonate V as claimed in claim 5, which comprises reacting a bistetramethylpiperidyl carbonate of the formula XVII

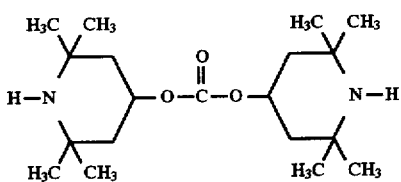

with a cyclic carbonate of the formula XIII

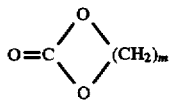
(XIII)

in which m is 2 or 3.

17. An organic material stabilized against the action of light, oxygen and heat, comprising an organic material and 0.01–5% by weight based on the quantity of said organic material, of at least one polymer as claimed in claim 1.

18. The organic material of claim 17, wherein said organic material is a plastic or coating material.

19. A method of stabilizing an organic material against the action of light, oxygen and heat, comprising adding to said organic material an effective amount of the polymer of claim 1.

20. The method of claim 19, wherein said organic material is a plastic or coating material.

* * * * *